United States Patent
Tipley

(10) Patent No.: US 7,412,611 B2
(45) Date of Patent: Aug. 12, 2008

(54) POWER MANAGEMENT WITH LOW POWER PROCESSES

(75) Inventor: Roger Edward Tipley, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 420 days.

(21) Appl. No.: 11/150,919

(22) Filed: Jun. 13, 2005

(65) Prior Publication Data

US 2006/0282689 A1   Dec. 14, 2006

(51) Int. Cl.
  *G06F 1/00*   (2006.01)
  *G06F 1/26*   (2006.01)
(52) U.S. Cl. .................... 713/300; 713/320; 713/323
(58) Field of Classification Search ............... 713/300, 713/320, 322; 703/22; 702/188
  See application file for complete search history.

(56) References Cited

U.S. PATENT DOCUMENTS

| | | | | |
|---|---|---|---|---|
| 5,557,557 A | * | 9/1996 | Frantz et al. | 703/22 |
| 6,804,632 B2 | * | 10/2004 | Orenstien et al. | 702/188 |
| 6,883,104 B2 | * | 4/2005 | Rosch | 713/322 |
| 2002/0157030 A1 | * | 10/2002 | Barker et al. | 713/320 |
| 2006/0020831 A1 | * | 1/2006 | Golla et al. | 713/300 |

FOREIGN PATENT DOCUMENTS

JP   2000105701 A   *   4/2000

OTHER PUBLICATIONS

Andrew Weissel et al, Dynamic Thermal Management for Distributed Systems, Proceedings of the First Workshop on Temperature-Aware Computer Systems, Munchen, Germany, Jun. 2004.

* cited by examiner

*Primary Examiner*—Suresh K Suryawanshi

(57) ABSTRACT

Systems, methodologies, media, and other embodiments associated with selectively regulating power consumption by a computing system are described. One exemplary method embodiment includes receiving a signal that power regulation is desired for a computing system. The exemplary method embodiment may also include selectively causing a low power process to be executed in the computing system to cause the computing system to consume less power on average than would be consumed if the low power process was not executed.

20 Claims, 5 Drawing Sheets

POWER MANAGEMENT WITH LOW POWER PROCESSES

BACKGROUND

Computers continue to consume more and more power. As power consumption increases, so do power management and heat management concerns. Some related sets of computers (e.g., rack mounted server systems) may be able to consume more power than is available to them. Similarly, some related sets of computers may be able to generate more heat than can be effectively removed. This may require data center designs having complicated and thus expensive power and cooling requirements. Additionally, this may lead to suboptimal use of data center space if fewer computers are deployed than could be supported by data center infrastructure other than the power and cooling.

Thus, various approaches to managing and selectively reducing power consumption have been taken. For example, some conventional software (e.g., operating system) based approaches use process schedulers to move power intense processes out of a hot system and into a cooler system. Similarly, process schedulers may simply remove a power intense process from a processor. However, such process schedulers may require additional processors to be available, may require power and heat data to be available for each processor in a system, and may not be configurable to address overall power and cooling issues for a set of related computers.

Another software based approach employs conventional ACPI (Advanced Configuration and Power Interface) processing. ACPI is an open specification that establishes industry standard interfaces for operating system directed computer configuration and power management. ACPI incorporates conventional power management BIOS (Basic Input Output System) code, an Advanced Power Management (APM) application programming interface (API), a plug and play BIOS API, Multiprocessor Specification (MPS) tables, and so on, into a single power management and configuration interface specification. However, ACPI based systems may be unaware of actual physical temperature or power conditions or thresholds and thus an operating system relying on ACPI may not be able to react to certain conditions.

Some conventional hardware based techniques for power management use temperature and/or power monitoring equipment to trigger actions including frequency scaling and voltage scaling for example. However, newer, larger integrated circuits may get hot at different locations at different times under different conditions and thus may require multiple monitoring systems that may be too slow or too non-specific to provide real-time responses to changing conditions. Furthermore, like conventional software approaches, these hardware based techniques may not be configurable to address overall power or cooling capacity for a set of related systems.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 1:
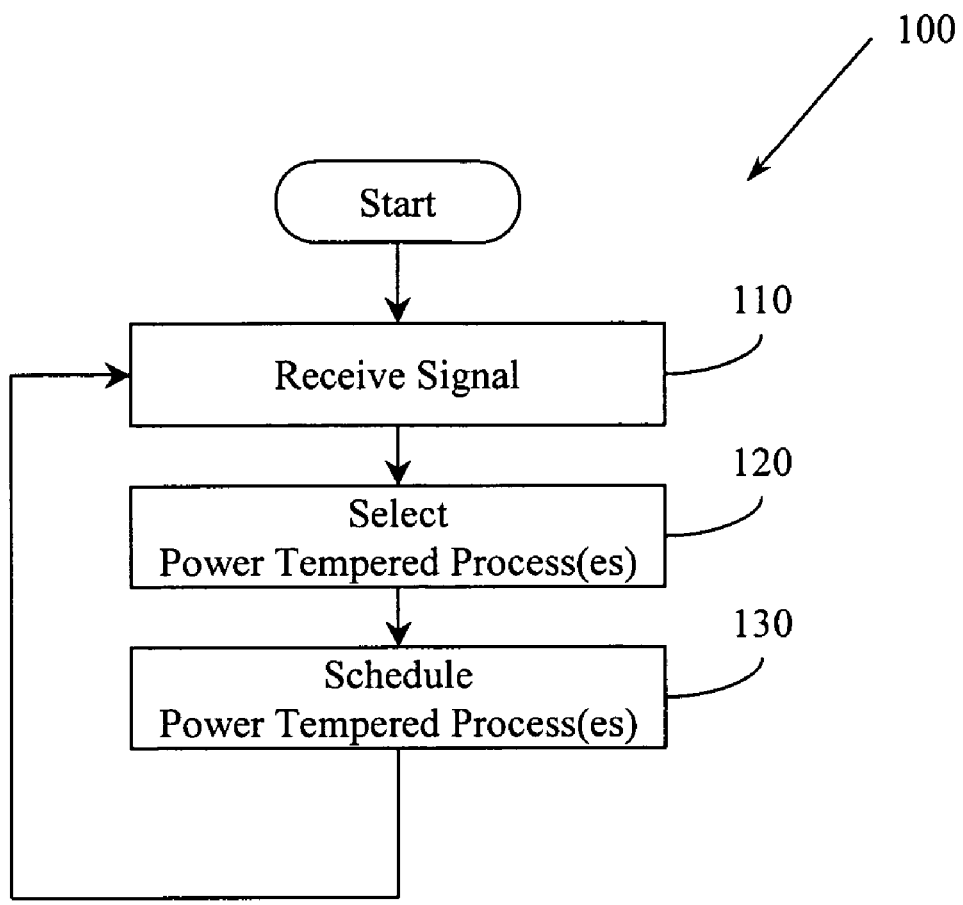
FIG. 1 illustrates an example method for regulating power in a computing system by executing power tempered processes.

Example systems, methods, media, and other embodiments described herein relate to regulating power consumption (e.g., usage) in a computing system. Regulating power consumption may include, for example, selectively lowering power consumption by scheduling and/or forcing a system to run processes having low power load characteristics. In one example, a computing system may be a stand-alone computer (e.g., a personal computer). In another example, a computing system may be a set of computers (e.g., a dozen rack-mounted servers). In another example, a computing system may be a set of racks filled with servers, the racks being located in a data center. A computing system (e.g., a rack-mounted server configuration) may have a known power consumption capacity from which a heat generation capacity can be predicted. Similarly, a facility like a data center may have a known power provision capacity and also a known cooling capacity. In addition, a computing system in use may have an observed power consumption level that is above, at, or below a desired power consumption level. Therefore, to facilitate reconciling power consumption with power capacity, a computing system may be configured to have its power regulated by example systems and methods described herein. By regulating power, heat generation may also be regulated.

The total power consumed by a computing system may be related to the number and types of processes running on the processor(s) available in the computing system. Furthermore, the power consumed may be related to the frequency and duration with which certain high level or power intense processes run. Therefore, example systems and methods may seek to manage power by controlling the types of processes running on the available processor(s) and the frequency with which they run. Rather than frequency and/or voltage scaling, rather than pre-empting or stopping a certain process, and rather than using an ACPI based approach, example systems and methods may provide for power tempered processes to be executed. These power tempered processes may have known characteristics (e.g., very low power consumption) that facilitate reducing power consumption. While the example systems and methods may not rely on frequency and/or voltage scaling and may not rely on ACPI, in some cases the example systems and methods may interact with these types of power management systems. Therefore, combinations of power management systems may provide power regulation performance superior to that achieved by individual approaches.

The number, type, and mix of power tempered processes that may be scheduled and executed may be related to how close a facility is to exceeding a power consumption threshold. In different examples, scheduling and executing the power reduction processes may be achieved in different ways. For example, user level processes, system level processes, and/or interrupt service routines, may individually and/or collectively interact to facilitate regulating power.

Similarly, in different examples power tempered processes may take different forms and in some cases may be configurable. For example, a power tempered process may be an actual user level application with known low power requirements or may be an artificial user level application with known low power requirements produced by executing a number of processor halting instructions. In some examples, a desired power regulation may be achieved by scheduling a mix of different types of power tempered processes. As mentioned above, a power tempered process may be configurable. For example, a first instance of a power tempered process may be configured to execute a first number of processor halting instructions over a first period of time while a second instance of the power tempered process may be configured to execute a second number of processor halting instructions over a second period of time.

The following includes definitions of selected terms employed herein. The definitions include various examples and/or forms of components that fall within the scope of a term and that may be used for implementation. The examples are not intended to be limiting. Both singular and plural forms of terms may be within the definitions.

"Computer-readable medium", as used herein, refers to a medium that participates in directly or indirectly providing signals, instructions and/or data. A computer-readable medium may take forms, including, but not limited to, non-volatile media, volatile media, and transmission media. Non-volatile media may include, for example, optical or magnetic disks and so on. Volatile media may include, for example, semiconductor memories and dynamic memories. Transmission media may include coaxial cables, copper wire, and fiber optic cables, for example. Transmission media can also take the form of electromagnetic radiation like that generated during radio-wave and infra-red data communications, or take the form of one or more groups of signals. Common forms of a computer-readable medium include, but are not limited to, a floppy disk, a hard disk, a magnetic tape, other magnetic medium, a CD-ROM, other optical medium, a RAM (random access memory), a ROM (read only memory), an EPROM, a FLASH-EPROM, or other memory chip or card, a memory stick, a carrier wave/pulse, and other media from which a computer, a processor or other electronic device can read. Signals used to propagate instructions or other software over a network, like the Internet, can be considered a "computer-readable medium."

"Heuristic", as used herein, refers to programming based on rules (e.g., "common sense" rules) that may, for example, be drawn from experience. Heuristics contrast with algorithmic programs that are based on mathematically provable procedures. In some examples, heuristics may include rules that are adaptable by self-learning.

"Logic", as used herein, includes but is not limited to hardware, firmware, software and/or combinations of each to perform a function(s) or an action(s), and/or to cause a function or action from another logic, method, and/or system. Based on a desired application or needs, logic may include a software controlled microprocessor, discrete logic like an application specific integrated circuit (ASIC), an analog circuit, a digital circuit, a programmed logic device, and a memory device containing instructions, for example. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

NMI refers to a non-maskable interrupt, an interrupt that typically is not ignored in an interrupt driven system unless the system has been specifically programmed to ignore the NMI. An NMI is typically used for critical problem situations (e.g., memory parity errors). Here, in one example, the NMI may be used when the need for a power managing operation reaches a threshold.

An "operable connection", or a connection by which entities are "operably connected", is one in which signals, physical communications, and/or logical communications may be sent and/or received. Typically, an operable connection includes a physical interface, an electrical interface, and/or a data interface. Note that an operable connection may include differing combinations of these or other types of connections sufficient to allow operable control. For example, two entities can be considered to be operably connected if they are able to communicate signals to each other directly or through intermediate entities including a processor, an operating system, a logic, and software for example. Logical and/or physical communication channels can be used to create an operable connection.

"Signal", as used herein, includes but is not limited to electrical or optical signals, analog or digital signals, data, computer or processor instructions, messages, a bit or bit stream, or other means that can be received, transmitted and/or detected.

"Software", as used herein, includes but is not limited to, computer or processor instructions that can be read, interpreted, compiled, and/or executed and that cause a computer, processor, or other electronic device to perform functions, actions and/or behave in a desired manner. The instructions may be embodied in various forms including routines, algorithms, modules, methods, threads, and/or programs including separate applications or code from dynamically linked libraries for example. Software may also be implemented in a variety of executable and/or loadable forms including, but not limited to, a stand-alone program, a function call (local and/or remote), a servelet, an applet, instructions stored in a memory, part of an operating system or other types of executable instructions. It will be appreciated by one of ordinary skill in the art that the form of software may depend, for example, on requirements of a desired application, the environment in which it runs, and/or the desires of a designer/programmer. It will also be appreciated that computer-readable and/or executable instructions can be located in one logic and/or distributed between two or more communicating, co-operating, and/or parallel processing logics and thus can be loaded and/or executed in serial, parallel, massively parallel and other manners.

Software suitable for implementing the various components of the example systems and methods described herein may include software produced using programming languages and tools including Java, C#, C++, C, APIs, SDKs, assembly, firmware, microcode, and/or other languages and tools for example. Software, whether an entire system or a component of a system, may be embodied as an article of manufacture and maintained or provided as part of a computer-readable medium as defined previously. Another form of the software may include signals that transmit program code of the software to a recipient over a network or other communication medium. Thus, in one example, a computer-readable medium has a form of signals that represent the software/firmware as it is downloaded from a web server to a user. In another example, the computer-readable medium has a form of the software/firmware as it is maintained on the web server. Other forms may also be used.

SMI refers to a system management interrupt. An SMI is an NMI that pre-empts and disables other interrupts. An SMI may be used to force a processor into a desired mode (e.g., a system management mode (SMM)). Here, in one example, an SMI may be used when the need for a power management operation reaches a threshold.

"User", as used herein, includes but is not limited to a person(s), software, computers or other devices, or combinations of these that benefit from, interact with, provide input to, and/or receive output from example systems or methods.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic.

It has proven convenient at times, principally for reasons of common usage, to refer to these signals as bits, values, elements, symbols, characters, terms, and numbers for example. It should be borne in mind, however, that these and similar terms are to be associated with the appropriate physical quantities and are merely convenient labels applied to these quantities. Unless specifically stated otherwise, it is appreciated that throughout the description, terms like processing, computing, calculating, determining, displaying, and so on, refer to actions and processes of a computer system, logic, processor, or similar electronic device that manipulates and transforms data represented as physical (electronic) quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks. While the figures illustrate various actions occurring in serial, it is to be appreciated that in different examples, various actions could occur concurrently, substantially in parallel, and/or at substantially different points in time.

FIG. 1 illustrates a method 100 associated with regulating power in a computing system. The illustrated elements denote "processing blocks" that may be implemented in logic. In one example, the processing blocks may be implemented in software. In another example, processing blocks may represent functions and/or actions performed by functionally equivalent circuits including an analog circuit, a digital signal processor circuit, and an application specific integrated circuit (ASIC), for example. FIG. 1, as well as the other figures, is not intended to limit the implementation of the described examples. Rather, the figures illustrate functional information one skilled in the art could use to design/fabricate circuits, generate software, or use a combination of hardware and software to perform the illustrated processing.

FIG. 1 illustrates a method 100 for regulating power in a computing system. Method 100 uses power tempered processes to regulate (e.g., reduce, maintain) the amount of power being consumed by a computing system. The computing system may be a stand alone system (e.g., a personal computer), a multiprocessor and/or multiprocessing system, a set of servers configured in a rack, and a set of racks filled with servers, for example. The amount of power consumed by the computing system will be related to a set of processes running and/or scheduled to run on the computing system. For example, processes associated with the computing system may be executing on a processor(s) in the computing system, scheduled to execute on a processor(s), in a process queue managed by an operating system, and so on. Over time, executing the processes will produce an average power consumption that exceeds, meets, or falls below a desired power consumption threshold. If the power consumption exceeds the threshold, conventional systems may shuffle processes from processor to processor, may throttle certain processes, or may simply halt the process or system. Method 100 does not use these approaches.

Method 100 may include, at 110, receiving a signal. The signal may be provided by an external and/or internal system and/or method and may indicate that method 100 is to regulate (e.g., reduce) power being consumed by the computing system. The signal may be viewed as a feedback signal from the computing system concerning its power consumption. The signal may include data that facilitates selecting and arranging for power tempered processes to run on the computing system. For example, the signal may include an indicator of an amount of power to be cut from the computing system. Similarly, the signal may include an indicator of how urgently the power cut is desired. The amount and urgency may be related to how close the computing system is to a power consumption threshold. Thus, the signal may include an indicator of how close to the threshold the computing system has approached. In one example, the signal may include data that describes the desired average power consumption for the computing system. This data may be compared, for example, to a power consumption tracking data available to method 100 to facilitate determining whether power regulation is required and if so in what amount and with what urgency. In one example, the signal may be received from an external monitoring system while in another example the signal may be received from a system integrated with the computing system.

Method 100 may also include, at 120, selecting a power tempered process(es) to execute in the computing system along with the set of processes currently executing and scheduled to execute. A power tempered process may be configured to facilitate having the computing system operate, for example, at an average level below a power consumption threshold. By adding power tempered processes to the set of processes running or scheduled to run on a computing system, the average power consumption may be reduced. For example, while the system may pass above the power consumption threshold while high power processes are running it may dip below the threshold while power tempered processes are running yielding a desired overall effect of running, on average, below a threshold. So, as a computing system begins to consume too much power method 100 may add power tempered processes to the mix of processes running or scheduled to run on the computing system. As these power tempered processes execute, they may consume less power than other high powered or power intense processes allowing the average power consumption to drop. If the power intense processes take longer to complete than the power tempered processes, then additional power regulation signals may be received and additional power tempered processes may be added. When the power intense processes do complete, they may leave behind a set of processes that does not drive the computing system beyond its power consumption threshold. Thus, additional power regulation signals might not be received and therefore as power tempered processes complete they might not be replaced with additional power tempered processes.

Different types of processes may be configured as power tempered processes. For example, a power tempered process may be an actual user level process with known power consumption attributes. By way of illustration, an application that does few computations, few memory accesses and few input/output operations (e.g., text mode time of day clock application showing only hours and minutes) may still perform useful work for a system while consuming very little power. A power tempered process may also be, for example, an artificial user level process with known power consumption attributes. An artificial process may be, for example, a process created specifically to facilitate regulating power consumption and that does no other useful work. In one example, the artificial process may be a user level process that has a set of halt instructions.

A power tempered process may also be an actual system level process with known low power consumption attributes. For example, certain system tasks can be completed without consuming much power because they require few computations, few memory accesses, few input/output operations, and so on. A power tempered process may also be an artificial system level process with known low power consumption attributes. Once again, the artificial system level process may be specifically configured to facilitate reducing power consumption and to perform no additional useful work. Thus, in one example, the system level process may include a set of halt instructions.

The power tempered process may be associated with an interrupt service routine for interrupts including a non-maskable interrupt (NMI) and a system management interrupt (SMI) for example. These power tempered processes may be useful, for example, for immediately executing a process that will facilitate cutting power consumption. User level processes may be scheduled by an operating system and thus their actual execution time may not be precisely known. Similarly, system level processes may compete for system resources and once again their execution time may not be precisely known. However, the time at which processing performed by an interrupt service routine associated with a high priority interrupt like an NMI and/or an SMI can be more precisely determined and more immediately controlled.

Thus, in one example, rather than taking a conventional approach like pre-empting processes, a power tempered process may be selected to be added to a set of processes running and/or scheduled to run on the computing system. Thus, rather than being throttled, an existing process may be able to run at full power/frequency/voltage when it executes. However it may execute less frequently because the power tempered process is also being scheduled and run. Additionally, an existing process does not need to be shuffled to a different processor or immediately pre-empted. Rather, it can be left alone except for the fact that an additional power tempered process(es) may be sharing (e.g., time slicing) the processor(s) on which the existing process is running. Thus, problems including those associated with relocating a process from processor to processor, those associated with running a voltage intense process at a lower voltage setting, and those associated with running a frequency intense process at a lower frequency setting for example, may be mitigated by employing the approach of method 100.

In one example, selecting a power tempered process at 120 may include identifying how much power reduction is required, how soon the power reduction is required, and so on. Thus, selecting a power tempered process at 120 may involve determining whether information concerning amount, urgency, and so on is available in the signal received at 110. Similarly, in another example, selecting a power tempered process at 120 may include identifying a power consumption level at which the computing system is targeted to run. Thus, selecting a power tempered process at 120 may include identifying a current power consumption level at which the computing system is operating and identifying a number, type, and/or mixture of power tempered processes that will force the power consumption level down to the desired level. To facilitate creating the right type and mix of processes, a power tempered process may be configurable with respect to attributes including duration, intensity, and priority for example.

Method 100 may also include, at 130, arranging for power tempered processes to execute in the computing system along with the set of processes that were already executing and/or scheduled to execute. In one example, arranging for the power tempered processes to execute may include scheduling a power tempered process to execute and/or generating an interrupt. Scheduling a power tempered process to execute may be achieved different ways. For example, scheduling may include making a scheduling request via an operating system scheduler. As described above, when employing an operating system scheduler, attributes including the time at which the power tempered process will run, the priority at which it will run, the processor on which it will run, and so on may not be completely controllable, if controllable at all. Thus, when finer grained control is desired, the arranging at 130 may involve using an interrupt service routine based scheduler. In this way, an operating system scheduler may be bypassed and some run-time parameters (e.g., time, processor) may be more controllable.

In one example, an interrupt service routine may even be configured to act as a power tempered process. For example, an interrupt service routine associated with an NMI, an SMI, or other similar high priority interrupt may be configured to do very little over a period of time sufficient to reduce power consumption. Once again, this may provide even finer control over scheduling achieved using lower priority interrupts or interrupt based scheduling.

While FIG. 1 illustrates various actions occurring in serial, it is to be appreciated that various actions illustrated in FIG. 1 could occur substantially in parallel. By way of illustration, a first process could receive signals, a second process could select processes to execute, and a third process could arrange for the selected processes to execute. While three processes are described, it is to be appreciated that a greater and/or lesser number of processes could be employed and that lightweight processes, regular processes, threads, and other approaches could be employed.

In one example, methodologies are implemented as processor executable instructions and/or operations stored on a computer-readable medium. Thus, in one example, a computer-readable medium may store processor executable instructions operable to perform a method that includes receiving a signal to regulate an amount of power consumed by a computing system where the amount of power being consumed is related to processes running and scheduled to run in the computing system. The method may also include, in response to receiving the signal, selecting a power tempered (e.g., low power) process(es) to execute in the computing system along with the set of processes and arranging for that process(es) to execute so that average power consumption is maintained below a desired level. While the above method is described being stored on a computer-readable medium, it is to be appreciated that other example methods described herein may also be stored on a computer-readable medium.

Figure 2:
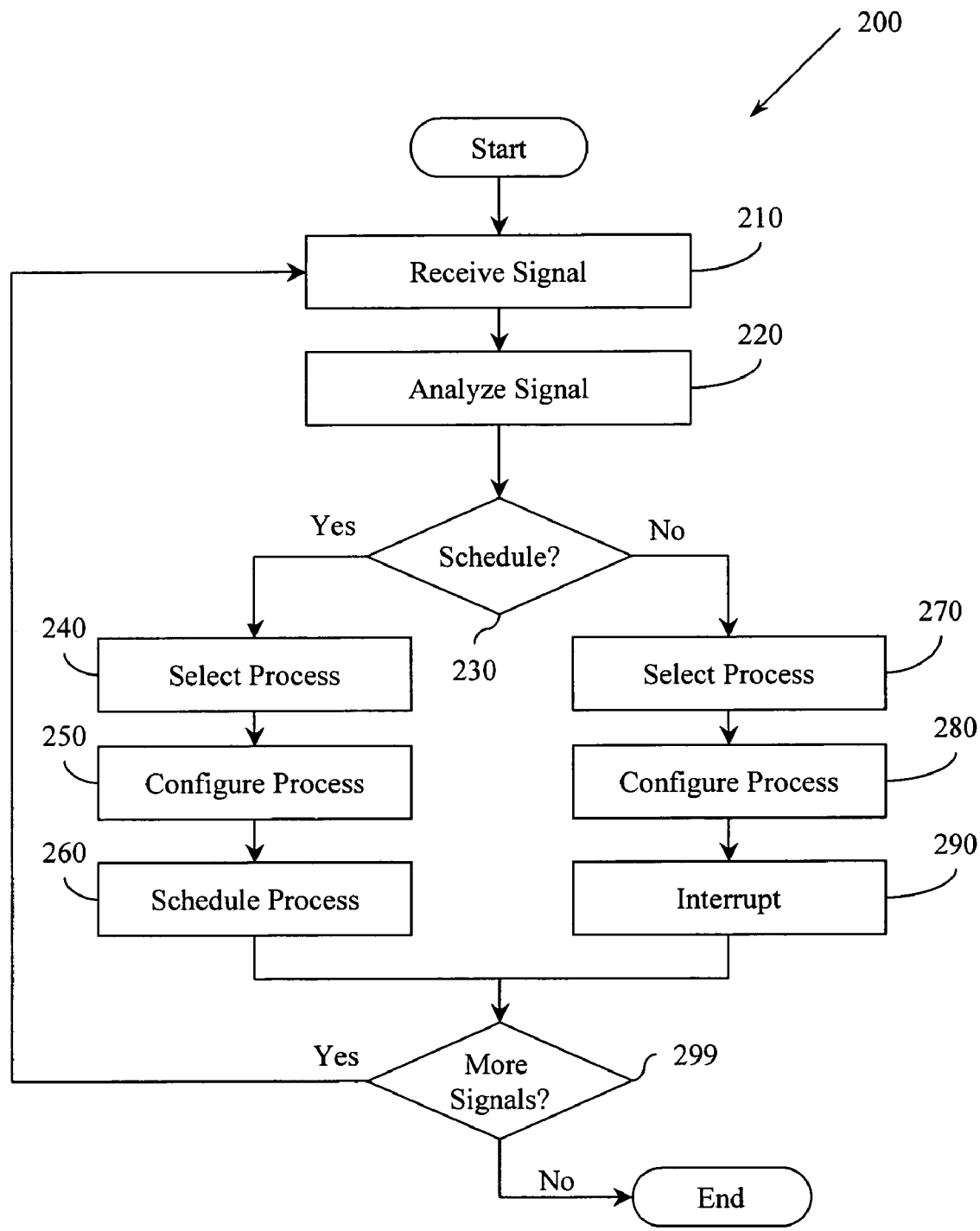
FIG. 2 illustrates another example method for regulating power in a computing system by executing power tempered processes.

FIG. 2 illustrates a method 200 for regulating power consumption in a computing system. Method 200 may include, at 210, receiving a signal that power consumption is to be regulated. In one example, the signal may indicate that power consumption is to be reduced to a certain level or by a certain amount. The signal may be received from various sources including power monitoring circuits internal to the computing system, temperature monitoring systems external to the computing system and so on.

Thus, in different examples, method 200 may be configured to interact with other systems associated with the computing system including a frequency scaling system, a voltage scaling system, and an ACPI system for example. These systems may individually facilitate providing a first level of power regulation for a computing system. However, when method 200 is configured to interact with these systems, it may provide a second higher level of power regulation for a computing system.

Method 200 may also include, at 220, analyzing the signal received at 210 to facilitate determining whether power regulation should occur, the degree to which it should occur, the urgency with which it should occur, other systems (e.g., scaling systems) to involve, and so on.

At 230 a determination may be made concerning whether a scheduling approach should be taken to schedule a power tempered process for execution or whether an interrupt based approach should be taken to cause a power tempered process to execute more immediately. In one example, a power tempered process may be viewed as a process that is configured to drive a computing system to a quiescent state having a power level near an idle computing system power level. In one example, the power tempered process may be configured to perform substantially no input/output operations, substantially no computations, and substantially no memory accesses. In one case, "substantially no" may refer to a minimum amount required to have a valid executable process that can be scheduled and/or run. In another case, "substantially no" may refer to zero occurrences.

While the power tempered process may drive the computing system into a quiescent state, it may also be a useful process that is configured to or is known to have low power requirements when compared to other processes. "Low power requirements" may refer to a process consuming less power than a pre-determined "high power" threshold. Low power requirements may be engineered by adding a number of processor halting instructions to a process, ensuring certain high power instructions are not present, and so on. Low power requirements may also be observed by monitoring a process in execution. Similarly, low power requirements may be estimated by characterizing a process based on the type, number, and/or mix of instructions in the process.

If the determination at 230 is Yes, that a process can be scheduled, then processing may continue at 240 where a power tempered process may be selected to be scheduled to run on the computing system where the other processes that lead to the power regulating signal being generated are running or are scheduled to run. In one example, where method 200 may be self adapting, the power tempered process may be selected according to a heuristic approach. Thus, over time, which process(es) are selected to regulate power may change based on observing a cause/effect relationship between scheduling processes and subsequent power regulation requests.

Power tempered processes may be configurable with respect to attributes including duration, intensity, and priority for example. Thus, method 200 may include, at 250, configuring the power tempered process(es) selected at 240. How a process is configured may depend, at least in part, on the signal received at 210. For example, the intensity, duration, or priority of the process may be based, at least in part, on data received in the signal received at 210. Method 200 may also include, at 260, scheduling the process(es) selected at 240. Scheduling the process(es) may include, for example, making a request to an operating system, placing a process in a process queue, and so on.

If the determination at 230 is No, that the power regulation should not be approached by scheduling a power tempered process but should be undertaken by causing more immediate execution of a power tempered process, then processing may continue at 270. This branch may be taken if, for example, drastic power reduction is urgently required. At 270, a process (es) may be selected and at 280 the process(es) may be configured. Rather than scheduling the process(es), at 290 an interrupt may be generated that facilitates more precisely and immediately causing the power tempered process to execute. For example, if the process selected at 270 is an interrupt service routine associated with an NMI, then the interrupt at 290 may be an NMI that the computing system is unlikely to ignore and is likely to process immediately.

At 299, a determination may be made concerning whether to receive more signals. If the determination is Yes, then processing may return to 210, otherwise processing may conclude. Method 200 may also include (not illustrated) sending a control signal to other systems including a frequency scaling system, a voltage scaling system, and an ACPI system, for example.

Figure 3:
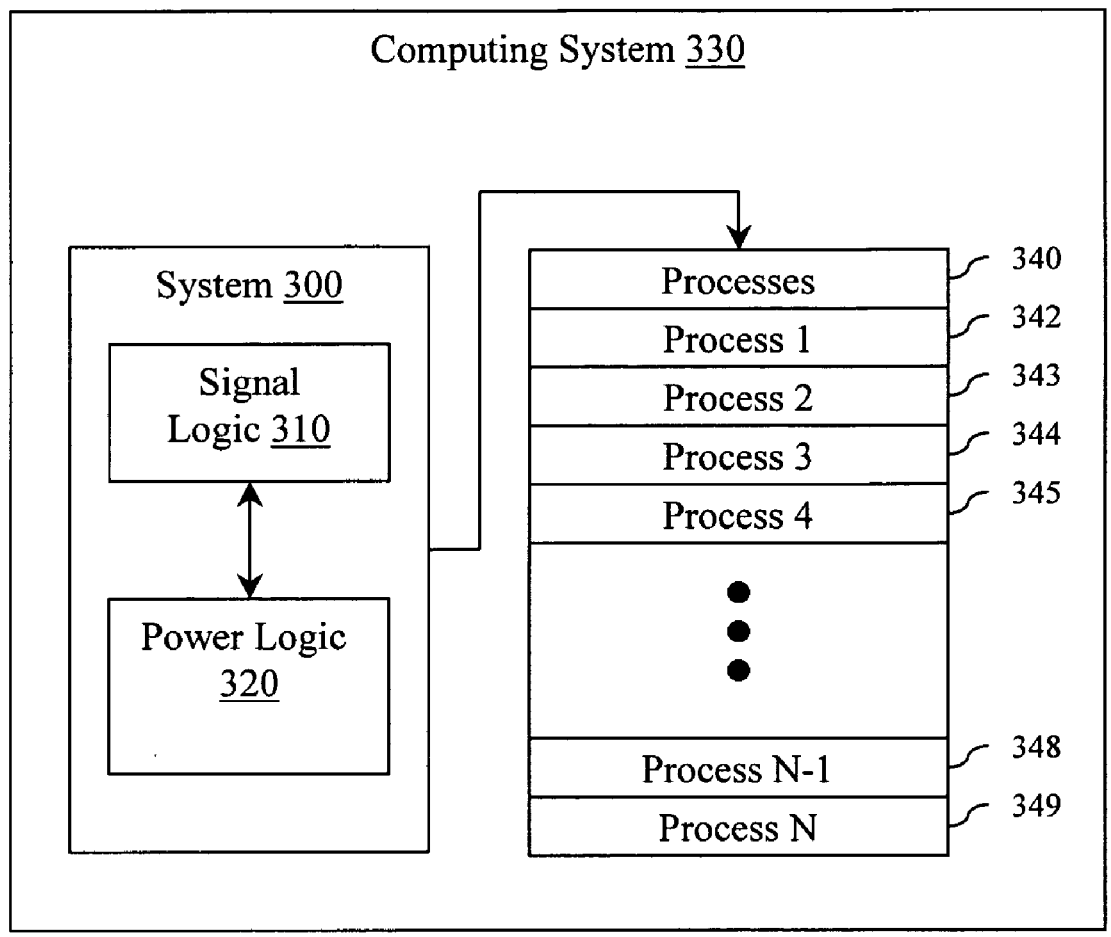
FIG. 3 illustrates an example system for regulating power in a computing system by executing low power processes.

FIG. 3 illustrates a system 300 that is configured to facilitate regulating power in a computing system 330 by causing low power processes to execute in computing system 330. While system 300 is illustrated inside computing system 330, it is to be appreciated that in different examples system 300 may be internal to, attached to, external to, operably connected to, and/or arranged in other configurations with respect to computing system 330.

System 300 may include a signal logic 310 that is configured to receive and analyze a power regulation signal. The power regulation signal may be provided by different systems or methods associated with computing system 330, a facility like a data center in which system 330 is located, and equipment like a rack in which system 330 is located, for example. The signal may indicate that power regulation is to be attempted and may also provide information concerning the nature of the power regulation including the desired degree, duration, and immediacy of the power regulation for example.

System 300 may also include a power logic 320 that is operably connected to signal logic 310. Power logic 320 may be configured to selectively control an amount of power consumed by computing system 330 by controlling, for example, a number, a type, and a mixture of low power processes to execute on computing system 330. By way of illustration, computing system 330 may be executing a set of processes 340 that includes some processes that are currently running, some processes that are blocked waiting for an i/o to complete, some processes that are ready to run, and so on. When executing set of processes 340 causes computing system 330 to exceed a power consumption threshold, a signal may be generated that is detected by signal logic 310. In response to the signal, power logic 320 may decide to add a low power process(es) to processes 340 in order to lower the average power consumed by computing system 330.

Thus, power logic 320 may be configured to select a low power process to execute on computing system 330. If a small amount of power reduction is requested, then a single low power process configured to produce a first level of power reduction may be added to processes 340. However, if a greater amount of power reduction is requested, then several lower power processes configured to produce a second level of power reduction may be added to processes 340. Similarly, if an even greater amount of power reduction is requested, then a large number of very low power processes configured to produce a third level of power reduction may be added to processes 340.

Different types of processes may be configured as low power processes. For example, low power processes may include, but are not limited to, user level processes, system level processes, and an interrupt service routine. Furthermore, low power processes may be configurable with respect to operating attributes including duration, intensity, and priority, for example. Thus, when a process is selected to be added to processes 340, it may be assigned a priority that makes it more or less likely to run than other processes in processes 340. Similarly, when a process is selected to be added to processes 340, it may be configured to run at a desired low power setting for a desired period of time.

In different examples, there are different ways that power logic 320 may control the number, the type, and/or the mixture of low power processes that execute on computing system 330. For example, power logic 320 may request that an operating system schedule a low power process, may add a process to an operating system process queue, may interrupt a processor to cause an interrupt service routine to execute, and so on. It is to be appreciated that in different examples power logic 320 may employ these techniques individually and/or in various combinations.

Figure 4:
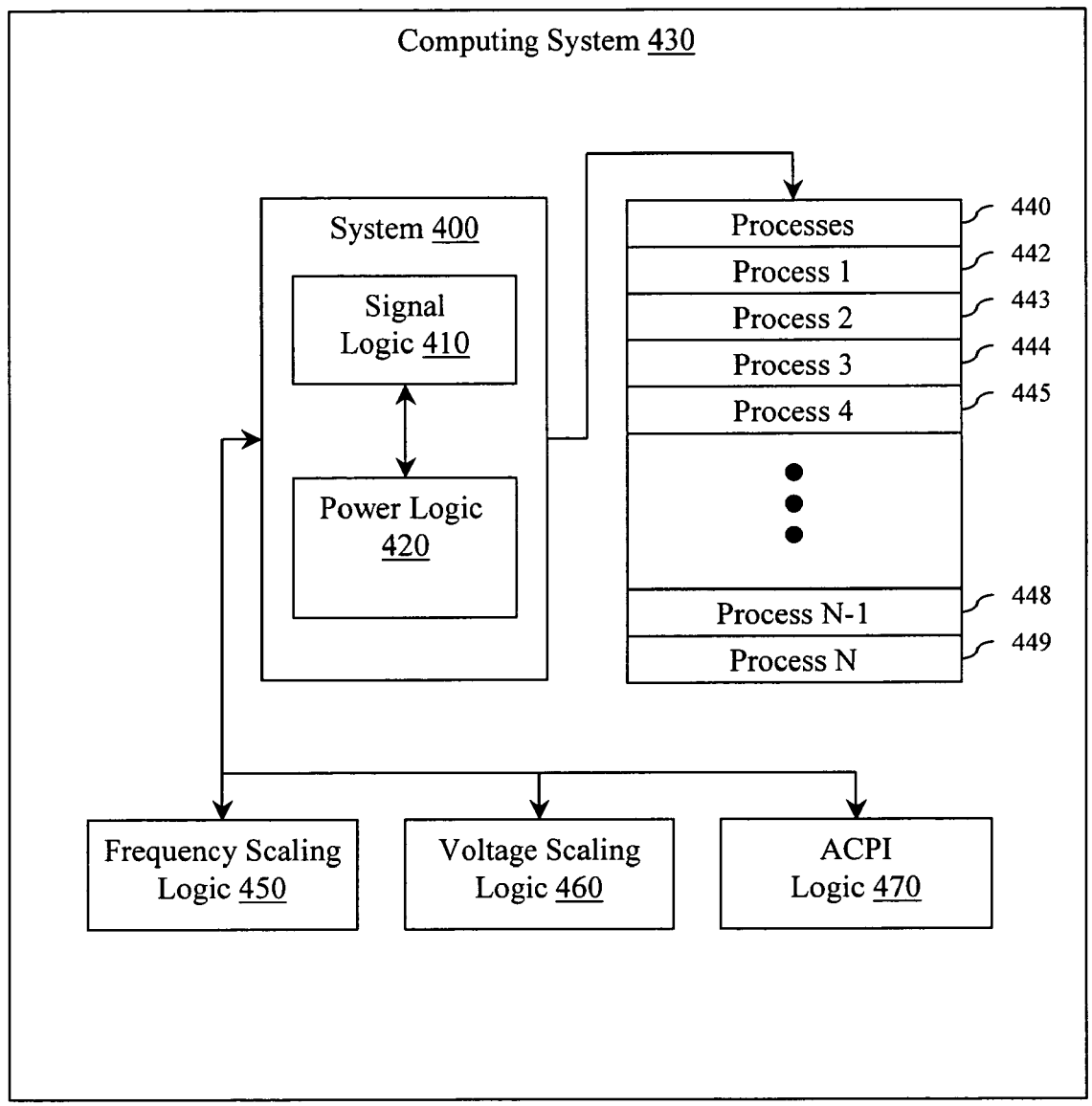
FIG. 4 illustrates another example system for regulating power in a computing system by executing low power processes.

FIG. 4 illustrates a system 400 that is also configured to facilitate regulating power in a computing system 430 by causing low power processes to execute in computing system 430. While system 400 is illustrated inside computing system 430, it is to be appreciated that in different examples system 400 may be internal to, attached to, external to, operably connected to, and/or arranged in other configurations with respect to computing system 430.

Like system 300 (FIG. 3), system 400 may include a signal logic 410 similar to signal logic 310 and a power logic 420 similar to power logic 320. However, system 400 may have additional functionality since it may interact with additional components. "Interacting with" may include, for example, receiving data from and/or providing data or control signals to the additional components. Signal logic 410 may be configured to receive data from other sources operably connected to computing system 430 including a frequency scaling logic 450, a voltage scaling logic 460, and an ACPI logic 470, for example. Receiving data from these additional sources may facilitate coordinating the activities of system 400 and the additional sources to provide more effective power regulation than could be achieved by the systems individually.

Thus, power logic 420 may also be configured to control, at least in part, frequency scaling logic 450, voltage scaling logic 460, and ACPI logic 470. While logics 450, 460, and 470 are illustrated inside computing system 430, it is to be appreciated that in different examples these logics may be located in computing system 430, attached to computing system 430, external to computing system 430, operably connected to computing system 430, and so on.

Figure 5:
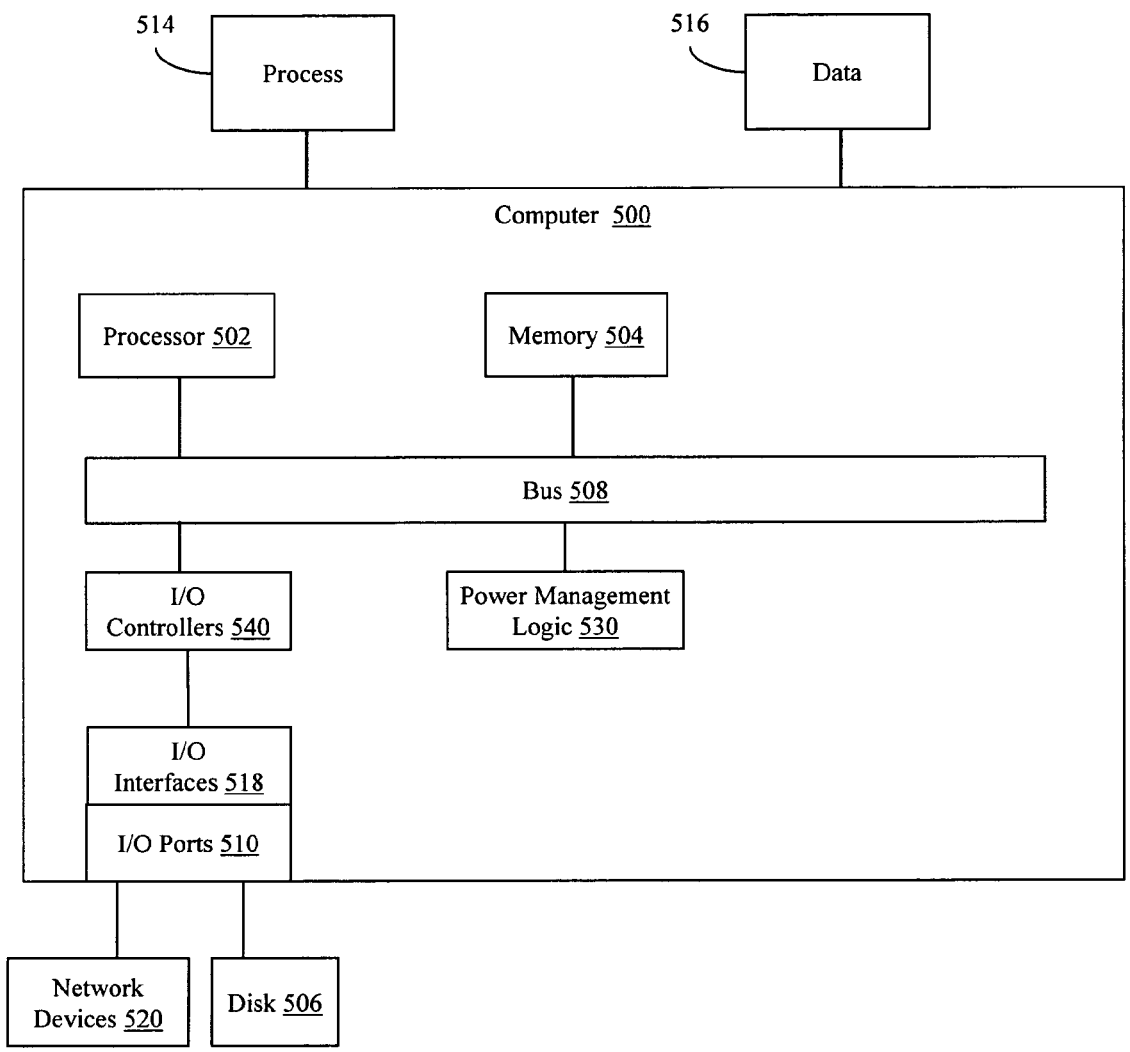
FIG. 5 illustrates an example computing environment in which example systems and methods illustrated herein can operate.

FIG. 5 illustrates an example computing device in which example systems and methods described herein, and equivalents, can operate. The example computing device may be a computer 500 that includes a processor 502, a memory 504, and input/output controllers 540 operably connected by a bus 508. In one example, computer 500 may include a power management logic 530 that is configured to facilitate scheduling and/or executing power reduction processes.

While power management logic 530 is illustrated as a hardware component attached to bus 508, it is to be appreciated that in one example, power management logic 530 could be implemented in software, stored on disk 506, brought into memory 504, and executed by processor 502. Thus, power management logic 530 may provide means (e.g., software, hardware, firmware) for automatically determining that power regulation is desired for a computing system, means (e.g., software, hardware, firmware) for selecting a power tempered process to execute on the computing system along with currently executing processes and means (e.g., software, hardware, firmware) for adding a power tempered process to a set of processes executing or scheduled to execute on the computing system.

Generally describing an example configuration of computer 500, processor 502 can be a variety of various processors including dual microprocessor and other multi-processor architectures. Memory 504 can include volatile memory and/or non-volatile memory. The non-volatile memory can include, but is not limited to, ROM, PROM, EPROM, EEPROM, and so on. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 506 may be operably connected to computer 500 via, for example, an input/output interface (e.g., card, device) 518 and an input/output port 510. Disk 506 may be, for example, a magnetic disk drive, a solid state disk drive, a floppy disk drive, a tape drive, a Zip drive, a flash memory card, and/or a memory stick. Furthermore, disk 506 may be an optical drive (e.g., a CD-ROM), a CD recordable drive (CD-R drive), a CD rewriteable drive (CD-RW drive), and/or a digital video ROM drive (DVD ROM). Memory 504 can store processes 514 and/or data 516, for example. Disk 506 and/or memory 504 can store an operating system that controls and allocates resources of computer 500.

Bus 508 may be a single internal bus interconnect architecture and/or other bus or mesh architectures. While a single bus is illustrated, it is to be appreciated that computer 500 may communicate with various devices, logics, and peripherals using other busses that are not illustrated (e.g., PCIE, SATA, Infiniband, 1394, USB, Ethernet). Bus 508 can be of a variety of types including, but not limited to, a memory bus or memory controller, a peripheral bus or external bus, a crossbar switch, and/or a local bus. The local bus can be of varieties including, but not limited to, an industrial standard architecture (ISA) bus, a microchannel architecture (MSA) bus, an extended ISA (EISA) bus, a peripheral component interconnect (PCI) bus, a universal serial (USB) bus, and a small computer systems interface (SCSI) bus.

Computer 500 may interact with input/output devices via i/o interfaces 518 and input/output ports 510. Input/output devices can include, but are not limited to, a keyboard, a microphone, a pointing and selection device, cameras, video cards, displays, disk 506, network devices 520, and so on.

Input/output ports 510 may include but are not limited to, serial ports, parallel ports, and USB ports.

Computer 500 may operate in a network environment and thus may be connected to network devices 520 via i/o devices 518, and/or i/o ports 510. Through network devices 520, computer 500 may interact with a network. Through the network, computer 500 may be logically connected to remote computers. The networks with which computer 500 may interact include, but are not limited to, a local area network (LAN), a wide area network (WAN), and other networks. Network devices 520 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), and Bluetooth (IEEE 802.15.1) for example. Similarly, network devices 520 can connect to WAN technologies including, but not limited to, point to point links, circuit switching networks (e.g., integrated services digital networks (ISDN)), packet switching networks, and digital subscriber lines (DSL) for example.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A computer-implemented method comprising:
    receiving a signal to regulate an amount of power consumed by a computing system the amount of power being related to a set of processes associated with one or more processors in the computing system, where members of the set of processes may be executing on a processors or scheduled to execute on a processor; and
    in response to receiving the signal:
        selecting one or more power tempered processes to execute in the computing system along with the set of processes, and
        arranging for the one or more power tempered processes to execute in the computing system along with the set of processes such that the collective average power consumption of the set of processes and the one or more power tempered processes is less than the average power consumption of the set of processes.

2. The method of claim 1, the power tempered processes being configured to cause the computing system to consume on average an amount of power below a power consumption threshold.

3. The method of claim 2, the power tempered processes comprising one or more of, an actual user level process with known power consumption attributes, an artificial user level process with known power consumption attributes, a user level process comprising a set of halt instructions, an actual system level process with known power consumption attributes, an artificial system level process with known power consumption attributes, a system level process comprising a set of halt instructions, an interrupt service routine for a non-maskable interrupt, and an interrupt service routine for a system management interrupt.

4. The method of claim 3, a power tempered process being configurable with respect to one or more of, duration, intensity, and priority.

5. The method of claim 1, the signal comprising one or more of, an amount indicator, an urgency indicator, a threshold approach indicator, and a desired average power indicator.

6. The method of claim 1, the computing system comprising a set of servers arranged in a rack mounted configuration.

7. The method of claim 1, a power tempered process being configured to place the computing system in a quiescent state having a power level near an idle computing system power level, the power tempered process being configured to perform substantially no input/output operations, substantially no computations, and substantially no memory accesses.

8. The method of claim 1, where arranging for the one or more power tempered processes to execute includes one or more of, scheduling a power tempered process to execute, and generating an interrupt where an interrupt service routine associated with the interrupt is configured as a power tempered process.

9. The method of claim 8, where scheduling a power tempered process to execute includes making a scheduling request via one or more of, an operating system scheduler, and an interrupt service routine based scheduler.

10. The method of claim 8, the interrupt being one of, a non-maskable interrupt (NMI), and a system management interrupt (SMI).

11. The method of claim 1, the method being configured to interact with one or more of a frequency scaling system associated with the computing system, a voltage scaling system associated with the computing system, and an ACPI (Advanced Configuration and Power Interface) system associated with the computing system.

12. The method of claim 1, the method being configured to select a power tempered process according to a heuristic, to schedule the power tempered process according to the heuristic, and to self-adapt the heuristic based, at least in part, on observing a power consumption reaction to selecting and scheduling the power tempered processes.

13. A computer-implemented method, comprising:
    receiving a signal to regulate an amount of power consumed by a computing system, the amount of power being related to a set of processes associated with one or more processors in the computing system, where members of the set of processes may be executing on a processor or scheduled to execute on a processor, the signal comprising one or more of, an amount indicator, an urgency indicator, a threshold approach indicator, and a desired average power indicator; and in response to receiving the signal:
selecting one or more power tempered processes to execute in the computing system along with the set of processes, and
arranging for the one or more power tempered processes to execute in the computing system along with the set of processes, the power tempered processes being configured to cause the computing system to consume on average an amount of power below a power consumption threshold, the power tempered processes comprising one or more of an actual user level process with known power consumption attributes, an artificial user level process with known power consumption attributes, a user level process comprising a set of halt instructions, an actual system level process with known power consumption attributes, an artificial system level process with known power consumption attributes, a system level process comprising a set of halt instructions, an interrupt service routine for a non-maskable interrupt, and an interrupt service routine for a system management interrupt, a power tempered process being configurable with respect to one or more of, duration, intensity, and priority,
where arranging for the one or more power tempered processes to execute includes one or more of, scheduling a power tempered process to execute, and generating an interrupt where an interrupt service routine associated with the interrupt is configured as a power tempered process, where scheduling a power tempered process to execute includes making a scheduling request via one or more of, an operating system scheduler, and an interrupt service routine based scheduler, and where the interrupt is one of, a non-maskable interrupt (NMI), and a system management interrupt (SMI).

14. A computer-readable medium storing processor executable instructions configured to perform the method of claim 13.

15. A system, comprising:
a signal logic configured to receive and analyze a power regulation signal; and
a power logic operably connected to the signal logic, the power logic being configured to selectively control an amount of power consumed by a computing system by controlling one or more of, a number, a type, and a mixture of low power processes to execute on the computing system, the power logic also being configured to select a low power process to execute on the computing system and to enable the low power process to execute on the computing system, the low power process causing the computing system to consume less power than a power consumption threshold.

16. The system of claim 15, the low power processes comprising one or more of, a user level process, a system level process, and an interrupt service routine, the low power processes being configurable with respect to one or more of, duration, intensity, and priority.

17. The system of claim 16, the signal logic being configured to receive data from one or more of, a frequency scaling logic associated with the computing system, a voltage scaling logic associated with the computing system, and an ACPI (Advanced Configuration and Power Interface) logic associated with the computing system.

18. The system of claim 17, the power logic being configured to control, at least in part, the frequency scaling logic, the voltage scaling logic, and the ACPI (Advanced Configuration and Power Interface) logic.

19. The system of claim 16, the power logic being configured to control the number, the type, or the mixture of low power processes to execute on the computing system by one or more of, requesting that an operating system schedule a low power process, adding a process to an operating system process queue, and interrupting a processor to cause an interrupt service routine to execute.

20. A system, comprising:
means for automatically determining that power regulation is desired for a computing system, where the power regulation is related to a set of processes associated with one or more processors in the computing system, where members of the set of processes may be executing on a processor or scheduled to execute on a processor;
means for selecting one or more power tempered processes to execute on the computing system along with the set of processes; and
means for adding the one or more power tempered processes to a set of processes executing or scheduled to execute on the computing system, where the one or more power tempered processes will execute in the computing system along with the set of processes such that the the collective average power consumption of the set of processes and the one or more power tempered processes is less than the average power consumption of the set of processes.

* * * * *

UNITED STATES PATENT AND TRADEMARK OFFICE
CERTIFICATE OF CORRECTION

PATENT NO. : 7,412,611 B2 Page 1 of 1
APPLICATION NO. : 11/150919
DATED : August 12, 2008
INVENTOR(S) : Roger Edward Tipley It is certified that error appears in the above-identified patent and that said Letters Patent is hereby corrected as shown below:

In column 13, line 61, in Claim 1, after "method" insert -- , --.

In column 13, line 63, in Claim 1, after "system" insert -- , --.

In column 14, line 54, in Claim 11, after "more of" insert -- , --.

In column 15, line 18, in Claim 13, after "more of" insert -- , --.

In column 16, line 45, in Claim 20, after "that the" delete "the".

Signed and Sealed this

Thirty-first Day of March, 2009

JOHN DOLL
*Acting Director of the United States Patent and Trademark Office*